United States Patent
Monro, Jr.

(10) Patent No.: US 6,865,881 B2
(45) Date of Patent: Mar. 15, 2005

(54) SYSTEM AND METHOD FOR REDUCING NITROGEN OXIDES IN COMBUSTION EXHAUST STREAMS

(75) Inventor: Robert W. Monro, Jr., Darien, CT (US)

(73) Assignee: Diesel & Combustion Technologies, LLC, Bethel, CT (US)

(*) Notice: Subject to any disclaimer, the term of this patent is extended or adjusted under 35 U.S.C. 154(b) by 0 days.

(21) Appl. No.: 10/298,981

(22) Filed: Nov. 18, 2002

(65) Prior Publication Data

US 2004/0093855 A1 May 20, 2004

(51) Int. Cl.$^7$ ................................................ F01N 3/00
(52) U.S. Cl. .......................... 60/286; 60/274; 60/280; 60/289; 60/307
(58) Field of Search ...................... 60/274, 286, 289, 60/280, 301, 303, 307

(56) References Cited

U.S. PATENT DOCUMENTS

| | | | |
|---|---|---|---|
| 4,208,386 A | 6/1980 | Arand et al. | |
| 5,165,903 A | 11/1992 | Hunt et al. | |
| 5,233,934 A | 8/1993 | Krigmont et al. | |
| 5,369,956 A * | 12/1994 | Daudel et al. | 60/276 |
| 5,544,483 A * | 8/1996 | Heuer | 60/283 |
| 5,605,042 A * | 2/1997 | Stutzenberger | 60/286 |
| 5,809,775 A | 9/1998 | Tarabulski et al. | |
| 5,884,475 A * | 3/1999 | Hofmann et al. | 60/274 |
| 5,974,789 A * | 11/1999 | Mathes et al. | 60/274 |
| 5,976,475 A | 11/1999 | Peter-Hoblyn et al. | |
| 6,048,510 A | 4/2000 | Zauderer | |
| 6,063,350 A | 5/2000 | Tarabulski et al. | |
| 6,110,435 A | 8/2000 | Lehner et al. | |
| 6,167,698 B1 * | 1/2001 | King et al. | 60/286 |
| 6,203,770 B1 | 3/2001 | Peter-Hoblyn et al. | |
| 6,260,353 B1 * | 7/2001 | Takahashi | 60/286 |
| 6,322,762 B1 | 11/2001 | Cooper et al. | |
| 6,354,079 B1 * | 3/2002 | Choi et al. | 60/286 |
| 6,526,746 B1 * | 3/2003 | Wu | 60/286 |
| 6,581,374 B2 * | 6/2003 | Patchett et al. | 60/286 |

* cited by examiner

Primary Examiner—Thomas Denion
Assistant Examiner—Diem Tran
(74) Attorney, Agent, or Firm—Edwards & Angell, LLP

(57) ABSTRACT

A system and method for reducing nitrogen oxide emissions ($NO_x$) in the exhaust from a combustion device, such as a reciprocating engine, using a solution containing a $NO_x$ reducing agent which is mixed with and atomized by air flow drawn from the combustion intake and injected into the combustion exhaust.

27 Claims, 2 Drawing Sheets

SYSTEM AND METHOD FOR REDUCING NITROGEN OXIDES IN COMBUSTION EXHAUST STREAMS

BACKGROUND OF THE INVENTION

1. Field of the Invention

The present invention is directed to a system and method for reducing nitrogen oxides ($NO_x$) in a fossil fuel combustion exhaust. More particularly, it relates to a system and method for reducing $NO_x$ in the combustion exhaust from a turbocharged engine.

2. Background of the Related Art

The combustion of fossil fuels results in the formation of nitrogen oxides ($NO_x$), a pollutant that leads to smog and acid rain, especially in urban environments. Most of the $NO_x$ formed during the combustion process is the result of two oxidation mechanisms. The first, referred to as thermal $NO_x$, is formed by the reaction of nitrogen at elevated temperatures with oxygen in the combustion air, said oxygen being present in excess of the amount required for stoichiometric combustion. The presence of excess oxygen is required for the combustion of all fossil fuels to minimize the generation of other pollutants, such as carbon monoxide. The second involves the oxidation of nitrogen that is chemically bound in the fossil fuel, and is referred to as fuel $NO_x$.

For example, in a coal fired furnace, thermal $NO_x$ typically represents about 25% and fuel $NO_x$ about 75% of the total $NO_x$ generated. However, for cyclone boilers or other boilers that operate at very high temperatures, thermal $NO_x$ can be considerably higher than fuel $NO_x$. Therefore, flame temperature, the residence time at temperature, and the degree of fuel/air mixing, along with the nitrogen content of the fossil fuel and the quantity of excess air used for combustion, will usually determine the $NO_x$ levels in the exhaust gas.

Combustion modifications, such as strict management of the mixing of fuel and air, temperature reduction/optimization, and measures which reduce turbulence can minimize $NO_x$ formation in some combustion devices.

In internal combustion engines, such as reciprocating engines, exhaust gas recirculation (EGR) has been used to reduce $NO_x$ emissions. This technique reduces the amount of oxygen involved in the combustion, by directing a portion of the exhaust gases back into the intake of the engine. The oxygen in the exhaust gases has already been used by the engine and the total amount of oxygen entering the combustion zone of the engine is reduced by since the combustion intake is a mixture of the exhaust gases containing little oxygen with the fresh intake air. Since there is less oxygen to react with, less $NO_x$ are formed. Also, the exhaust gases do not participate in the combustion process which lowers the peak operating temperature and results in less thermal $NO_x$ formation.

Although EGR reduces $NO_x$ emissions, the technique also increases particulate emissions and the chances that certain apparatus, such as heat exchangers, will be fouled by the particulates. Furthermore, the substitution of the intake fuel/air mixture with exhaust gases reduces the power generated by the engine and lowers engine performance. Reduced power generation poses a significant problem to the end users that depend on reciprocating engines to generate electrical power, such as electrical power companies which rely on reciprocating engines, especially during peak load times, to enhance power distribution quality and reliability.

Furthermore, there is increasing demand for reciprocating engines which are powerful enough to satisfy substantial power needs not being supplied by power companies, since using reciprocating engines offers a faster, less expensive alternative to constructing large, central power plants and high-voltage transmission lines.

Regulatory requirements for controlling $NO_x$ emissions, such as those pertaining to ground-level ozone issues, are advancing at a rapid pace. Emission limits are becoming more stringent while at the same time the need for devices that produce $NO_x$ emissions as a byproduct is increasing.

For such reasons, it is anticipated that the use of post-combustion controls via selective catalytic reduction (SCR) and selective non-catalytic reduction (SNCR) will significantly increase to achieve greater removal of $NO_x$ than is obtainable by combustion modification alone.

In SCR, a vessel containing a catalyst, such as vanadium/titanium formulations (e.g., $V_2O_5$ stabilized in a $TiO_2$ base), activated carbon, zeolite materials, compositions of active metals and support materials or the like, is installed downstream of the combustion zone. A reducing agent, typically ammonia ($NH_3$), is injected into the flue gas before it passes over the fixed-bed catalyst. The catalyst promotes a reaction between $NO_x$ and the ammonia to form nitrogen ($N_2$) and water vapor.

SNCR involves the injection of a reducing agent, typically either urea or ammonia, with or without various chemical additives, into the combustion exhaust gases at temperatures at which the $NO_x$ to $N_2$ reaction is favored.

SCR is similar to SNCR in that it uses a reducing agent applied to the effluent gas from the combustion zone to convert $NO_x$ emissions to elemental nitrogen and water. The key difference between the two is the presence of the catalyst in the SCR system, which accelerates the chemical reactions. The catalyst is needed because SCR systems operate at much lower temperatures than do the SNCR; typical temperatures for SCR are 340 to 575° C. (650 to 1100° F.), compared with 870 to 1,200° C. (1,600 to 2,200° F.) for SNCR.

SNCR and SCR can be used together, and either process can be used in conjunction with Low $NO_x$ Burners (LNBs), which are designed to control the mixing of fuel and air to achieve what amounts to staged combustion. While all these $NO_x$ control processes reduce $NO_x$ emissions to varying degrees, they all have certain technical and economic limitations and disadvantages.

The present invention is directed to a system and method which reduces $NO_x$ and through advantageous use of components in the combustion process, among other things, eliminates some of the disadvantages in the prior art $NO_x$ control systems and methods, primarily in prior art SNCR and SCR operations.

SUMMARY OF THE DISCLOSURE

The present invention is directed to a system and method for reducing the concentration of nitrogen oxides in the exhaust gases generated by the combustion of fossil fuels in a combustion device having an air intake stream for supplying air to the combustion device and an effluent stream for discharging the exhaust gases from the combustion device.

In particular, the present invention is directed to a system and method for reducing the concentration of nitrogen oxides in the exhaust gases generated by the combustion of fossil fuels in a reciprocating engine having a turbocharger in communication with the engine intake stream.

In general, a system constructed in accordance with the present invention includes a bypass conduit which extends between the air intake and effluent streams and is configured to draw a portion of the air flow from the air intake stream. The system may include a means for controlling the air flow drawn into the bypass conduit. An injector is in communication with the bypass conduit and the effluent stream for receiving the bypass air flow and injecting it into the effluent stream. A feed conduit from a source of a fluid reducing agent for nitrogen oxides is in communication with the injector to introduce the fluid reducing agent to the bypass air flow in the injector. The system may also include a means for controlling the rate at which the fluid reducing agent is introduced to the injector. The fluid reducing agent is atomized by the bypass air flow and injected into the effluent stream. Preferably, the effluent stream is directed to a SCR zone downstream of the injector.

In accordance with the present invention, the aforementioned system can include a forced induction system, such as a turbocharger, for compressing the air flow in the air intake stream. Preferably, the forced induction system is positioned upstream of the bypass conduit.

The aforementioned system may further include a plurality of injectors in communication with the bypass conduit and/or a plurality of bypass conduits.

The present invention is also directed to a method for reducing the concentration of nitrogen oxides in the exhaust gases generated by the combustion of fossil fuels in a combustion device having an air intake stream for supplying air to the combustion device and an effluent stream for discharging the exhaust gases from the combustion device. The method in accordance with the present invention includes the steps of: drawing air flow from the air intake stream into a bypass conduit bypassing the combustion device; atomizing a fluid reducing agent for nitrogen oxides in the air flow through the bypass conduit; and injecting the atomized fluid reducing agent from the bypass conduit into the effluent stream. In addition, the aforementioned method preferably includes the step of directing the effluent stream into a SCR zone.

In accordance with the present invention, the aforementioned method may further include the step of introducing the fluid reducing agent to the bypass conduit from a feed conduit in communication with a source of the fluid reducing agent.

The aforementioned method can also include the step of compressing the air flow in the air intake stream, which may be accomplished by using a turbocharger positioned upstream of the bypass conduit. In this embodiment, it is preferable to inject the atomized fluid reducing agent into the effluent stream at a position downstream of the turbocharger.

The present invention is also directed to a method for reducing the concentration of nitrogen oxides in the exhaust gases generated by a reciprocating engine having a combustion zone, intake and exhaust manifolds and a turbocharger associated with the intake and exhaust manifolds. The method includes the steps of: drawing air flow from the intake manifold into a bypass conduit bypassing the combustion zone of the reciprocating engine at a position downstream of the turbocharger; atomizing a solution containing urea in the air flow in the bypass conduit; and injecting the atomized solution into the exhaust manifold at a position downstream of the turbocharger.

In accordance with the present invention, the aforementioned method may include injecting the atomized solution into the exhaust manifold in a plurality of locations.

The present invention is also directed to a combustion device having a combustion zone, an air intake stream for supplying air to the combustion zone and an effluent stream for discharging the exhaust gases from the combustion zone. The device also includes a bypass conduit extending between the air intake stream and the effluent stream, thereby bypassing the combustion zone, which is configured to draw a portion of the air flow from the air intake stream. An injector is in communication with the bypass conduit and the effluent stream for receiving the bypass air flow and injecting it into the effluent stream. A feed conduit is in communication with the injector for introducing a fluid reducing agent for nitrogen oxides into the injector which is thereafter atomized by bypass air flow through the injector. A source of the fluid agent may be inboard the combustion device or independent.

In another embodiment, the aforementioned combustion device includes a turbocharger. Preferably, the bypass conduit is positioned downstream of the compressor side on the turbocharger and the injector is positioned downstream of the turbine side on the turbocharger.

The present invention is also directed to a reciprocating engine having a combustion zone, an air intake manifold for supplying air to the combustion zone, an air exhaust manifold for discharging the exhaust gases from the combustion zone and a turbocharger operatively associated with the intake and exhaust manifolds. A bypass conduit is positioned downstream of the turbocharger and extends between the air intake manifold and the exhaust manifold to bypass the combustion zone for drawing a portion of the air flow from the air intake manifold. An injector is in communication with the bypass conduit and the exhaust manifold to receive the bypass air flow and inject the bypass air flow into the exhaust manifold. A feed conduit is in communication with the injector for introducing a fluid reducing agent for nitrogen oxides into the injector, which is atomized by the bypass air flow before being injected into the exhaust manifold.

The present invention relates to a system and method for reducing nitrogen oxides in the exhaust gases from the combustion process in a turbocharged engine having an exhaust manifold, an intake manifold and a turbocharger for supplying compressed air to the intake manifold. A portion of the compressed air to the intake manifold is used to atomize a solution containing urea which is thereafter injected into the exhaust gases flowing in the exhaust manifold.

These and other aspects of the system and method of the present invention will become more readily apparent to those having ordinary skill in the art from the following detailed description of the invention taken in conjunction with the drawings.

BRIEF DESCRIPTION OF THE FIGURES

So that those having ordinary skill in the art to which the present invention pertains will more readily understand how to make and use the method and system of the present invention, embodiments thereof will be described in detail with reference to the drawings, wherein.

DETAILED DESCRIPTION OF THE PREFERRED EMBODIMENTS

Figure 1:
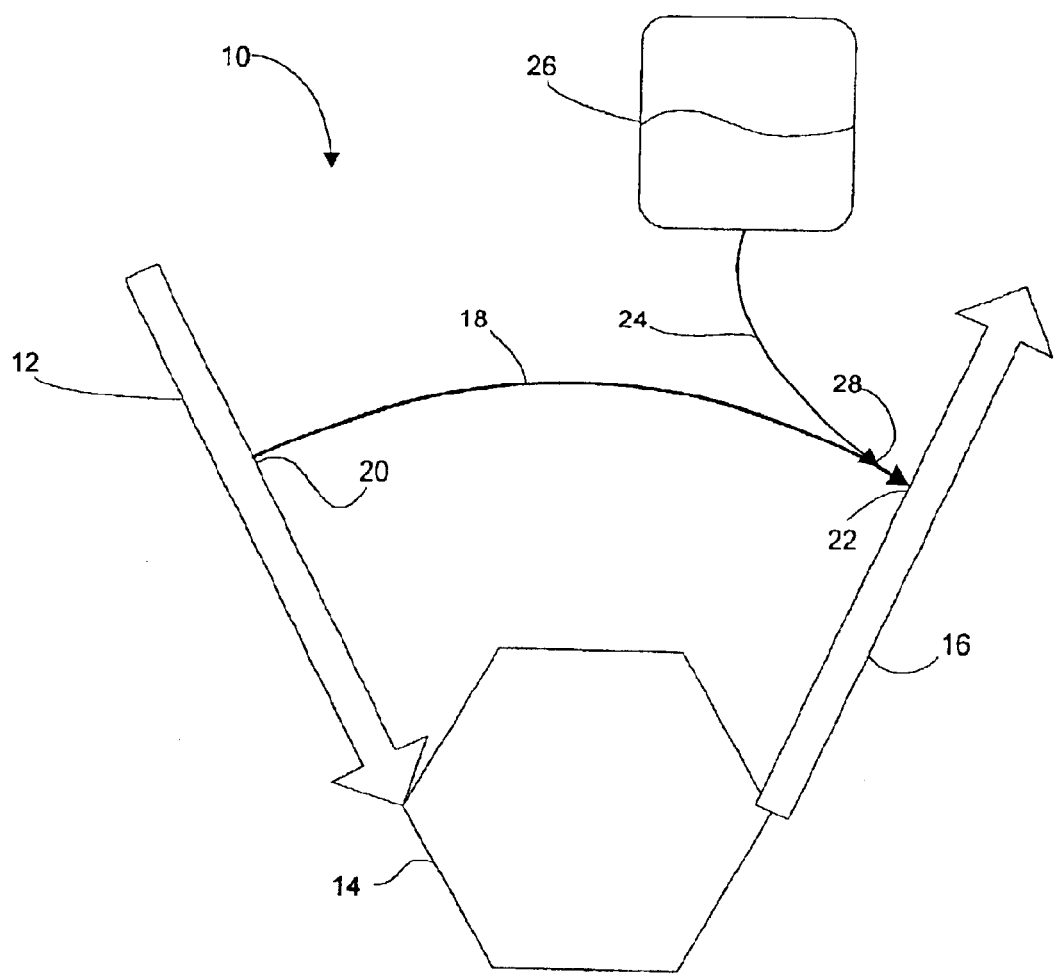
FIG. 1 is a schematic diagram depicting the functional components of a system and method for $NO_x$ reduction in accordance with the present invention.

Reference is now made to the accompanying figures for the purpose of describing, in detail, the preferred embodiments of the present invention. Unless otherwise apparent, or stated, positional references, such as "downstream" and "upstream", are intended to be relative to the manner in which air flows through the embodiment shown in the figures. Also, a given reference numeral should be understood to indicate the same or a similar structure when it appears in different figures.

The present invention is directed to a system and method for using a portion of the intake air being fed to a combustion device which emits $NO_x$ in the effluent therefrom to atomize at least one reducing agent for $NO_x$, and injecting the combination of air and atomized reducing agent into the combustion effluent stream to effect $NO_x$ reduction. The figures and accompanying detailed description are provided as examples of systems and methods in accordance with the present invention and are not intended to limit the scope of the claims appended hereto in any way.

Preliminarily, it should be understood that a system and method in accordance with the present invention may be advantageously constructed with or retrofitted on an existing combustion device that burns fossil fuel, such as organic fuels, natural gas and petroleum or petroleum-derived products. Thus, the particular type of fuel, engine, burner, boiler or other like device, is not vital to the implementation and use of a system and method in accordance with the present invention.

Urea can be used as an example of a reducing agent in accordance with the present invention. The chemical reaction taking place in the exhaust gas by which NO and $NO_2$ therein are removed is shown below for urea:

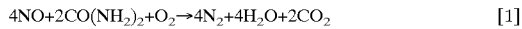

$$4NO+2CO(NH_2)_2+O_2 \rightarrow 4N_2+4H_2O+2CO_2 \quad [1]$$

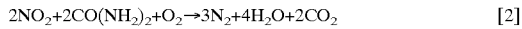

$$2NO_2+2CO(NH_2)_2+O_2 \rightarrow 3N_2+4H_2O+2CO_2 \quad [2]$$

Urea and ammonia have achieved widespread commercial acceptance as reducing agents. In general, urea (also known as carbamide) is preferable to ammonia for many applications because ammonia presents substantial environmental and operating hazards and risk because of its high volatility and noxious nature. Urea, on the other hand, is a stable, non-volatile, environmentally benign material that is safely transported, stored and handled without such risk. Furthermore, using urea minimizes the chance of air heater fouling and plugging when unreacted ammonia combines with sulfur trioxide to form ammonium bisulphate downstream, which is a particular concern if fuels containing high sulfur content are used.

Nonetheless, it should be understood that the reducing agents which can be employed in the present invention are not limited to urea or ammonia. The reducing agent may be ammonia, urea, ammonia radicals, ammonia precursors (e.g., ammonium carbonate, ammonium hydrazine, ammonium hydroxide, ammonium formate, ammonium oxalate), or similar compounds, in any form, which yield ammonia upon vaporization, either alone or in any mixture thereof. Preferably, the reducing agent is supplied to the system in a fluid carrier. For example, the reducing agent may be dissolved or mixed with water, depending on the solubility of the reducing agent.

Referring now to the drawings wherein like reference numerals identify similar elements, there is a schematic representation illustrated in FIG. 1 of the system and method for reducing $NO_x$ in an exhaust stream in accordance with the present invention designated generally by reference numeral 10. System 10 includes an air intake line 12 for supplying air flow to combustion apparatus 14 which utilizes the oxygen in the air flow for combustion with a fossil fuel. Exhaust gases from the combustion apparatus 14 exit through an exhaust line 16. It should be understood that a system in accordance with the present invention operates independently of the manner in which fuel is fed to apparatus 14, or subsequently burned therein. Fuel feed lines are not shown in the accompanying figures.

In accordance with the present invention, a portion of air flow travelling through air intake line 12 is directed into a bypass line 18 at a location 20 upstream of combustion apparatus 14. Air flowing through bypass line 18 will not enter combustion apparatus 14 and instead is fed to exhaust line 16 at a location 22 downstream of combustion apparatus 14. A solution of a reducing agent in a carrier is provided by a feed line 24 from a source tank 26 and introduced to air bypass line 18 at a location 28 along bypass line 18. This carrier solution contains at least one reducing agent for nitrogen oxides, which preferably includes urea. The carrier solution is provided by feed line 24 to air bypass line 18 in sufficient amounts permitting optimal atomization of the carrier solution in the air flow therein prior to discharge into the exhaust line 16 at location 22. Preferably, the addition and discharge of the reducing agent to system 10 is conducted in a manner that assures the maximum utilization of the reducing agent in subsequent SCR processes.

If urea is used as the reducing agent, it will form ammonia and ammonia radicals which can be used to charge the catalyst in a downstream SCR zone, thus eliminating the need, trouble and expense associated with the handling of ammonia, per se.

It is envisioned that a system and method in accordance with the present invention may be modified in various ways, depending on, among other things, the operating temperature of the particular combustion device. For example, system 10 may include a SNCR zone if location 22 is positioned along exhaust line 16 at a point where the temperature is within the temperature window for the $NO_x$ reduction reaction. Subsequently, exhaust line 16 can be directed through a SCR zone or other post-combustion device for still further reduction of $NO_x$.

It is also contemplated that a system and method in accordance with the present invention may utilize more than one $NO_x$ control technology, and furthermore, provide synergistic benefits when combining certain $NO_x$ control technologies, such as SNCR and SCR. For example, if the urea is added to system 10 to achieve SNCR, some of the ammonia will "slip," that is, remain unreacted in exhaust line 16, likely due to the temperature within exhaust line 16 falling out of the temperature range necessary for maintaining the reduction reaction. When using urea as the reducing agent, the optimum temperature window for efficient SNCR operation typically occurs between about 1620° F. to about 2010° F. (about 900° to about 1100° C.), but the reduction reaction may occur at other higher or lower temperatures as well, even as low as about 390° F. (about 200° C.), although the $NO_x$ removal rate will decrease. When the reaction temperature increases over about 1832° F. (about 1000° C.), the $NO_x$ removal rate decreases due to thermal decomposition of ammonia. On the other hand, if the temperature decreases below about 1832° F., then ammonia slip may increase. The longer the reducing agent is in the optimum temperature window, the greater the $NO_x$ reduction. Residence times in excess of one second yield optimum $NO_x$ reductions but a minimum residence time of 0.3 seconds is desirable to achieve moderate SNCR effectiveness.

Although ammonia slip may occur, the ammonia can be advantageously utilized in a downstream SCR zone for further $NO_x$ removal. The reaction between the ammonia and $NO_x$ is catalyzed in the SCR zone so that the $NO_n$ reduction reactions occur at much lower temperatures than in the SNCR zone. Typical temperatures for SCR using ammonia as the reducing agent range from about 650° F. to about 720° F. (about 340° C. to about 380° C.). Along with greater $NO_x$ reduction, this hybrid configuration of SNCR/SCR zones will also eliminate the need, trouble and expense associated with the handling of ammonia. Furthermore, a much smaller catalytic zone is needed than would be required in a standalone conventional SCR system since the inclusion of a SNCR zone provides additional $NO_x$ reduction, thus significantly reducing the costs associated with purchasing and replacing the catalyst.

Figure 2:
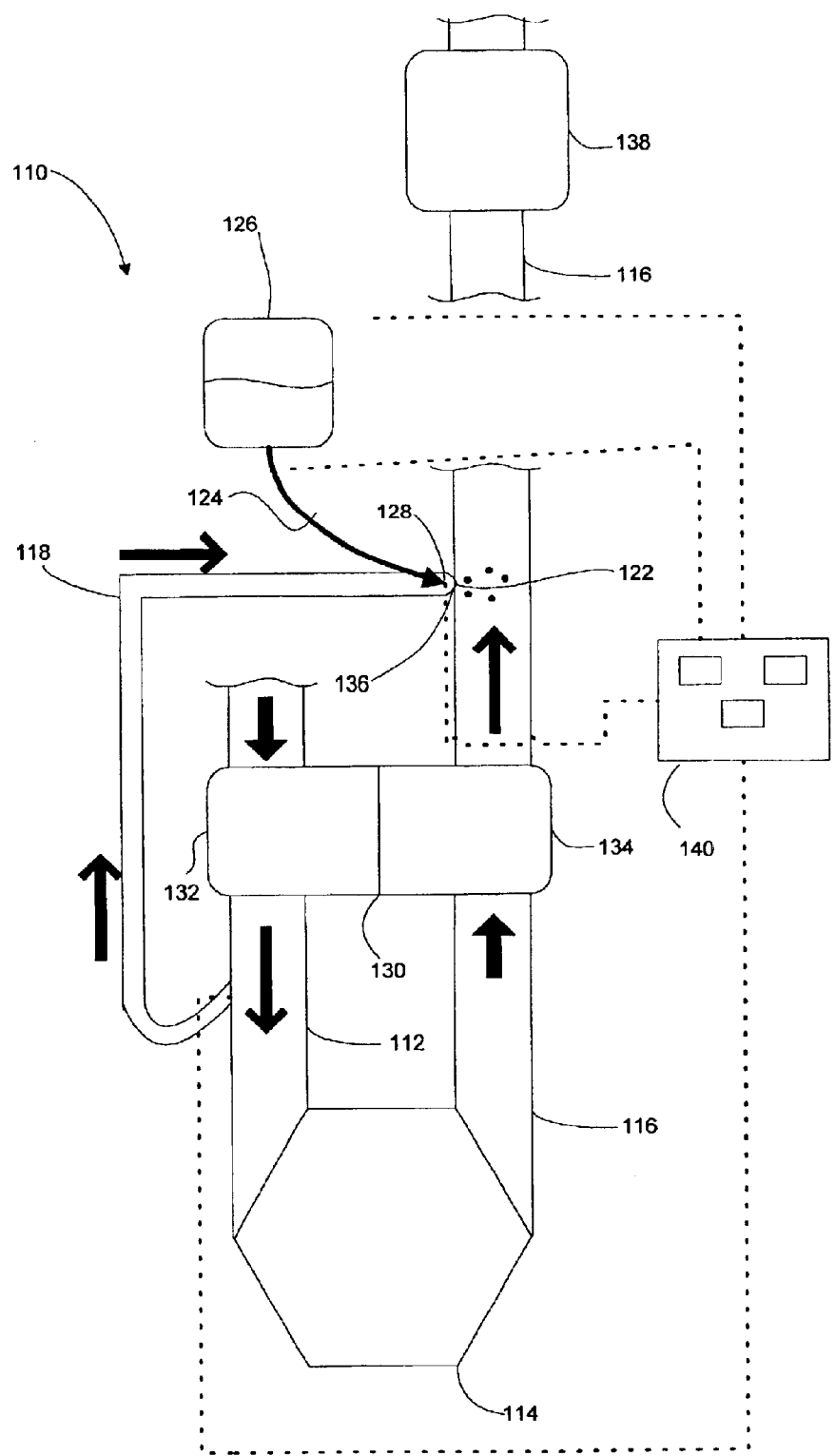
FIG. 2 is a schematic diagram depicting a preferred embodiment of a system and method for $NO_x$ reduction in accordance with the present invention wherein a turbocharger is used to compress the combustion intake air stream.

Referring now to FIG. 2, there is shown a schematic representation of a system and method for reducing nitrogen oxides in an exhaust stream in accordance with a presently preferred embodiment of the present invention. System 110 is substantially similar to the previous embodiment but differs in that system 110 includes a forced induction system which forces more air into an internal combustion device than the device would normally draw in by itself. The resulting denser air/fuel mixture produces more powerful explosions which enhance engine performance. A forced induction system may increase the power output by as much as 50% or more when compared to the same device without a forced induction system. Those skilled in the art will readily appreciate that various types of forced induction systems, such as a turbocharger or a supercharger, advantageously may be used in system 110 so long as the intake air flow is compressed prior to entering internal combustion device 114 which, for illustrative purposes, is a reciprocating engine in this embodiment. Engine 114 may be powered by diesel, natural gas, or a combination thereof (i.e., dual fuel).

System 110 includes a conventional turbocharger 130. Typically, a turbocharger comprises a housing containing two separate air passages. Exhaust gases pass through the hot air passage, and intake air passes through the cold air passage. Inside the turbocharger are two impellers or wheels containing pinwheel-like fins connected by a central shaft. The cold side wheel is generally referred to as the compressor wheel and the hot side wheel is generally called the turbine wheel. Exhaust gases leaving the exhaust manifold pass through the hot side, while intake air passes through the cold side. The exhaust gases cause the turbine wheel to spin. The spinning turbine wheel causes the compressor wheel to spin, thus compressing the air passing through the cold side.

For purposes of illustrating the features of system 110 as disclosed herein, reference is made only to a compressor side 132 and a turbine side 134 of turbocharger 130. In use, air is drawn into intake manifold 112 via a pump, fan or other conventional means, and then compressed while passing through compressor side 132. Exhaust gases from engine 114 flow through exhaust manifold 116 and turbine side 134 of turbocharger 130. After passing through turbine side 134, the exhaust gas receives the atomized reducing agent from an injector 136 connected with bypass conduit 118 and exhaust manifold 116 at location 122, as discussed in detail below.

A portion of the compressed intake air flow is directed into bypass conduit 118 while the remaining compressed intake air flow enters engine 114. Air flow from intake manifold 112 may be directed, drawn or bled into bypass conduit 118 by any conventional means, such as for example, via a pump, transverse conduit, valve or forked section of pipe. The compressed air flowing through bypass conduit 118 is used to atomize the carrier solution (including reducing agent or agents therein) upon being introduced at location 128 to bypass conduit 118 by a connection with feed line 124 from storage tank 126. Using the compressed air flow through bypass conduit 118 provides various benefits to system 110 performance including, among other things, the ability to contain a greater amount of atomized carrier solution per volume of air flow without the expense of adding a separate air compressor.

Bypass conduit 118 discharges the atomized carrier solution to exhaust manifold 116 which, as shown in FIG. 2, is at a location 122 downstream of turbine side 134. Preferably, locations 128 and 122 (i.e., wherein the feed line connects with bypass conduit 118 and atomized solution is released from bypass conduit 118 into exhaust manifold 116, respectively) are shown as being within an injector 136. Thus, atomization of the carrier solution occurs in injector 136 and the atomized solution is immediately injected into the exhaust manifold 116.

In a preferred embodiment, the solution includes urea, which decomposes in the high temperature effluent in exhaust manifold 116 to form gaseous ammonia. The resulting effluent can thereafter flow into a SCR zone 138 wherein the exhaust, including the ammonia gas, is exposed to a catalyst bed for further $NO_x$ reduction.

Various system 110 components may be operatively associated with a process control system 140. In this embodiment, process control system 140 is configured to control the volumetric rate of air flowing into bypass conduit 118 by any conventional means such as a control valve included in the bypass conduit. The amount of carrier solution which flows from feed line 124 to injector 136 is also controlled by process control system 140 by any conventional means for adjusting fluid flow therein. In addition, process control system 140 is operatively associated with tank 126 for determining the amount of carrier solution contained therein. Furthermore, the flow through injector 136 may be adjusted by process control system 140. Preferably, injector 136 is extendable into exhaust manifold 116 and controlled by process control system 140.

Cooling, heating or other temperature adjustment devices, such as a heat exchanger, may be operatively associated with different components of system 110 for changing the temperature of the air flow therein. For example, a cooler may be optionally disposed along bypass line 118 and/or intake 112 downstream of turbocharger 130 to cool the air prior to being used as the atomizing medium for the reducing agent.

In general, the present invention is directed to a method of reducing nitrogen oxides. The systems and methods described herein may result in as high as about a 97% reduction of $NO_x$ from the exhaust or effluent from a combustion device if properly optimized.

It should be understood that a system and method in accordance with the present invention may also include other equipment, such as control instrumentation, hardware and software to adjust, diagnose and optimize the system based on input and operating parameters and measurements; rate of addition of carrier solution to the bypass or injection location and rate, or other parameters relating to the $NO_x$ reduction or combustion process, for such things as load changes and spikes in emissions, etc. Also, the present system and method may include equipment for storing, mixing, metering and pumping the reducing agent and carrier solution involved in the process.

In particular, multi-level injection equipment may be incorporated with the present system and method to place the reducing agent in various locations where it is most effective, as nitrogen oxide distribution may vary within the cross section of the exhaust. A plurality of injectors and grid of injection points may be used with the present system and method to ensure proper distribution of the reducing agent, optimize the reduction reaction or minimize ammonia slip, among other things.

Although exemplary and preferred aspects and embodiments of the present invention have been described with a full set of features, it is to be understood that the disclosed system and method may be practiced successfully without the incorporation of each of those features. It is to be further understood that modifications and variations may be utilized without departure from the spirit and scope of this inventive system and method, as those skilled in the art will readily understand. Such modifications and variations are considered to be within the purview and scope of the appended claims and their equivalents.

What is claimed is:

1. A system for reducing the concentration of nitrogen oxides in the exhaust gases generated by the combustion of fossil fuels in a combustion device having an air intake stream for supplying air to the combustion device and an effluent stream for discharging the exhaust gases from the combustion device, the system comprising:
    (a) a bypass conduit extending between the air intake stream and the effluent stream, wherein the bypass conduit is configured to draw a portion of the air flow from the air intake stream;
    (b) an injector in communication with the bypass conduit and the effluent stream for receiving the bypass air flow and for injecting the bypass air flow into the effluent stream;
    (c) a feed conduit in communication with the injector for introducing a fluid reducing agent for nitrogen oxides into the injector, wherein the bypass air flow through the injector atomizes the fluid reducing agent in the injector and the injector is configured for injecting the atomized agent with the bypass air flow into the effluent stream; and
    (d) a source of the fluid reducing agent communicating with the feed conduit.

2. A system as recited in claim 1, further comprising a forced induction system for compressing the air flow in the air intake stream.

3. A system as recited in claim 2, wherein the forced induction system is positioned upstream of the bypass conduit.

4. A system as recited in claim 3, wherein the forced induction system comprises a turbocharger.

5. A system as recited in claim 4, wherein the injector is in communication with the combustion effluent stream at a position downstream of the turbocharger.

6. A system as recited in claim 1, wherein the fluid reducing agent includes urea.

7. A system as recited in claim 1, wherein the fluid reducing agent is a reducing agent dissolved in a fluid carrier.

8. A system as recited in claim 1, further comprising a SCR zone in communication with the effluent stream, wherein the SCR zone is positioned downstream of the injector.

9. A system as recited in claim 1, further comprising means for controlling the rate at which air is drawn into the bypass conduit.

10. A system as recited in claim 1, further comprising means for controlling the rate at which the fluid reducing agent is introduced to the injector.

11. A system as recited in claim 1, further comprising a plurality of injectors in communication with the bypass conduit forming a grid of injection points for enhancing distribution of the atomized reducing agent within the exhaust gases of the effluent stream.

12. A system as recited in claim 1, further comprising a plurality of bypass conduits.

13. A method for reducing the concentration of nitrogen oxides in the exhaust gases generated by the combustion of fossil fuels in a combustion device having an air intake stream for supplying air to the combustion device and an effluent stream for discharging the exhaust gases from the combustion device, the method comprising the steps of:
    (a) drawing air flow from the air intake stream into a bypass conduit bypassing the combustion device;
    (b) atomizing a fluid reducing agent for nitrogen oxides in the air flow through the bypass conduit; and
    (c) injecting the atomized fluid reducing agent and the air flow from the bypass conduit into the effluent stream.

14. A method according to claim 13, further comprising the step of introducing the fluid reducing agent to the bypass conduit from a feed conduit in communication with a source of the fluid reducing agent.

15. A method according to claim 13, further comprising the step of compressing the air flow in the air intake stream.

16. A method according to claim 13, further comprising the step of compressing the air intake stream using a turbocharger positioned upstream of the bypass conduit.

17. A method according to claim 16, wherein the step of injecting the atomized fluid reducing agent into the effluent stream further comprises injecting the atomized fluid reducing agent into the effluent stream at a position downstream of the turbocharger.

18. A method according to claim 13, further comprising the step of directing the effluent stream into a SCR zone.

19. A method for reducing the concentration of nitrogen oxides in the exhaust gases generated by a reciprocating engine having a combustion zone, intake and exhaust manifolds and a turbocharger associated with the intake and exhaust manifolds, comprising the steps of:
    (a) drawing air flow from the intake manifold into a bypass conduit bypassing the combustion zone of the reciprocating engine at a position downstream of the turbocharger;
    (b) atomizing a solution containing urea with the air flow from the bypass conduit; and
    (c) injecting the atomized solution with the air flow from the bypass conduit into the exhaust manifold at a position downstream of the turbocharger.

20. A method according to claim 19, wherein the step of injecting the atomized solution into the exhaust manifold at a position downstream of the turbocharger further comprises injecting the atomized solution into the exhaust manifold in a plurality of locations for enhancing distribution of the atomized reducing agent within the exhaust gases of the exhaust manifold.

21. A combustion device having a combustion zone, an air intake stream for supplying air to the combustion zone and an effluent stream for discharging the exhaust gases from the combustion zone, the combustion device comprising:
    (a) a bypass conduit extending between the air intake stream and the effluent stream thereby bypassing the combustion zone, wherein the bypass conduit is configured to draw a portion of the air flow from the air intake stream;

(b) an injector in communication with the bypass conduit and the effluent stream for receiving the bypass air flow and for injecting the bypass air flow into the effluent stream; and (c) a feed conduit in communication with the injector for introducing a fluid reducing agent for nitrogen oxides into the injector, wherein the bypass air flow through the injector atomizes the fluid reducing agent in the injector and the injector is configured for injecting the atomized agent with the bypass air flow into the effluent stream.

22. A combustion device as recited in claim 21, further comprising a source of the fluid reducing agent communicating with the feed conduit.

23. A combustion device as recited in claim 21, further comprising a turbocharger having an compressor side and a turbine side, wherein the bypass conduit is positioned downstream of the compressor side of the turbocharger and the injector is positioned downstream of the turbine side of the turbocharger.

24. A combustion device as recited in claim 21, wherein the fluid reducing agent is urea.

25. A reciprocating engine having a combustion zone, an air intake manifold for supplying air to the combustion zone, an air exhaust manifold for discharging the exhaust gases from the combustion zone and a turbocharger operatively associated with the intake and exhaust manifolds, the reciprocating engine comprising:

(a) a bypass conduit positioned downstream of the turbocharger and extending between the air intake manifold and the exhaust manifold to bypass the combustion zone, wherein the bypass conduit is configured to draw a portion of the air flow from the air intake manifold;

(b) an injector in communication with the bypass conduit and the exhaust manifold for receiving the bypass air flow and for injecting the bypass air flow into the exhaust manifold; and (c) a feed conduit in communication with the injector for introducing a fluid reducing agent for nitrogen oxides into the injector, wherein the bypass air flow through the injector atomizes the fluid reducing agent in the injector and the injector is configured for injecting the atomized agent with the bypass air flow into the effluent stream.

26. A reciprocating engine as recited in claim 25, wherein the fluid reducing agent includes urea.

27. A reciprocating engine as recited in claim 25, wherein the fluid reducing agent includes aqueous ammonia.

* * * * *